United States Patent [19]
Draim

[11] Patent Number: 5,979,832
[45] Date of Patent: Nov. 9, 1999

[54] DUAL RING ARRAY OF SATELLITES

[75] Inventor: John E. Draim, Vienna, Va.

[73] Assignee: Mobile Communication Holdings, Inc., Washington, D.C.

[21] Appl. No.: 09/108,871

[22] Filed: Jul. 1, 1998

Related U.S. Application Data

[60] Provisional application No. 60/072,208, Jan. 22, 1998, abandoned.

[51] Int. Cl.$^6$ ........................................ B64G 1/00
[52] U.S. Cl. ........................ 244/158 R; 455/12.1; 455/13.1; 455/13.2; 455/427
[58] Field of Search .................. 455/12.1, 13.1, 455/13.2, 427, 428, 422, 430, 431, 13.3, 424, 18; 244/158 R, 159, 63; 342/356, 357; 343/754, 100; 359/867

[56] References Cited

U.S. PATENT DOCUMENTS

| | | | |
|---|---|---|---|
| 4,809,935 | 3/1989 | Draim | 244/158 R |
| 4,854,857 | 8/1989 | Draim | 244/158 R |
| 5,120,007 | 6/1992 | Pocha et al. | 244/158 R |
| 5,267,167 | 11/1993 | Glickman | 701/226 |
| 5,326,054 | 7/1994 | Turner | 244/158 R |
| 5,553,816 | 9/1996 | Perrotta | 244/158 R |
| 5,669,585 | 9/1997 | Castiel et al. | 244/158 R |
| 5,788,187 | 8/1998 | Castiel et al. | 244/158 R |
| 5,845,206 | 12/1998 | Castiel et al. | 455/13.4 |
| 5,867,783 | 2/1999 | Horstein et al. | 455/427 |

Primary Examiner—Dwayne D. Bost
Assistant Examiner—Charles Craver
Attorney, Agent, or Firm—Fish & Richardson P.C.

[57] ABSTRACT

Array of satellites in a planetary gear arrangement. One ring is circular, and within the other ring, which is elliptical. The circular and elliptical rings overlap at a tangent point. At that point, the satellites are evenly spaced for at least a specified parameter, e.g., time of day or geographical location.

12 Claims, 4 Drawing Sheets

1

DUAL RING ARRAY OF SATELLITES

This application is a continuation of provisional application Ser. No. 60/072,208 filed Jan. 22, 1998, now abandoned.

FIELD

The present invention relates to a dual ring array of satellites. More specifically, the present invention describes a system where two rings are formed in a gear system, where one ring is elliptical and the other of the rings is circular and the satellites in the two rings interact like planetary gears at and near apogees of the elliptical orbit.

BACKGROUND

Satellites are often used to communicate between different points on the earth. The coverage of a satellite refers to the amount of the earth's surface that can communicate with the satellite. Since the satellites must orbit the earth, different parts of the earth may communicate with the earth at different times.

One of the most common satellite systems is a geosynchronous satellite. Those satellites orbit at the same rate as the earth so that each satellite always communicates with the same part of the earth. There are many limitations of geosynchronous satellites, however. One such limitation is their great height. Because of their great height, the communication delay back and forth to the satellite can become noticeable. Also, the cost to boost a satellite into this very high orbit can be very high. Finally, only so many slots are available in the geosynchronous orbital plane. Many of those slots are already taken.

Previous patents by the assignee of the present invention have been directed to the advantages of elliptical satellites. These advantages include lower earth orbit and hence less delay, easier payload and hence less cost to boost into orbit. An additional advantage includes asymmetric coverage of the earth.

This asymmetric coverage can tailor certain parameters to population and or time of day.

SUMMARY

The present invention defines a new array of satellites for communication with the earth. This new array of satellites include an array which looks like a planetary gear system. All satellites in this preferred array are in low to medium earth orbit—i.e., at heights which are lower than that necessary for a geosynchronous orbit.

The specific gear array uses two interactive orbital rings. An outer ring contains circular orbit satellites. An inner ring contains elliptical orbit satellites. The apogees of the elliptical orbits are approximately tangential to the diameter of the circular earth orbits. The periods of the two rings are adjusted as described herein to be proportional to the numerical ratio of the number of satellites in one ring with that of the other. This allows the elliptical inner ring satellites always to be spaced midway between the satellites (or "teeth") of the outer ring for a specified parameter. This spacing can be tailored to a specific point on the earth, or to a given time of day.

DETAILED DESCRIPTION OF THE INVENTION

In the preferred embodiment described herein, the spacing between satellites will be approximately equal anywhere in the world during daytime hours. Nighttime coverage is often less critical since fewer people are presumably using resources at night—more people are sleeping. Hence, the circular satellites are presumed to be capable of handling that traffic alone, without the elliptical satellites. The fact that the inner elliptic ring satellites overtake and pass the outer circular ring satellites on the night-time side of the earth is thus not a cause for concern.

The array of satellites in orbit is called a "gear" array.

Figure 1:
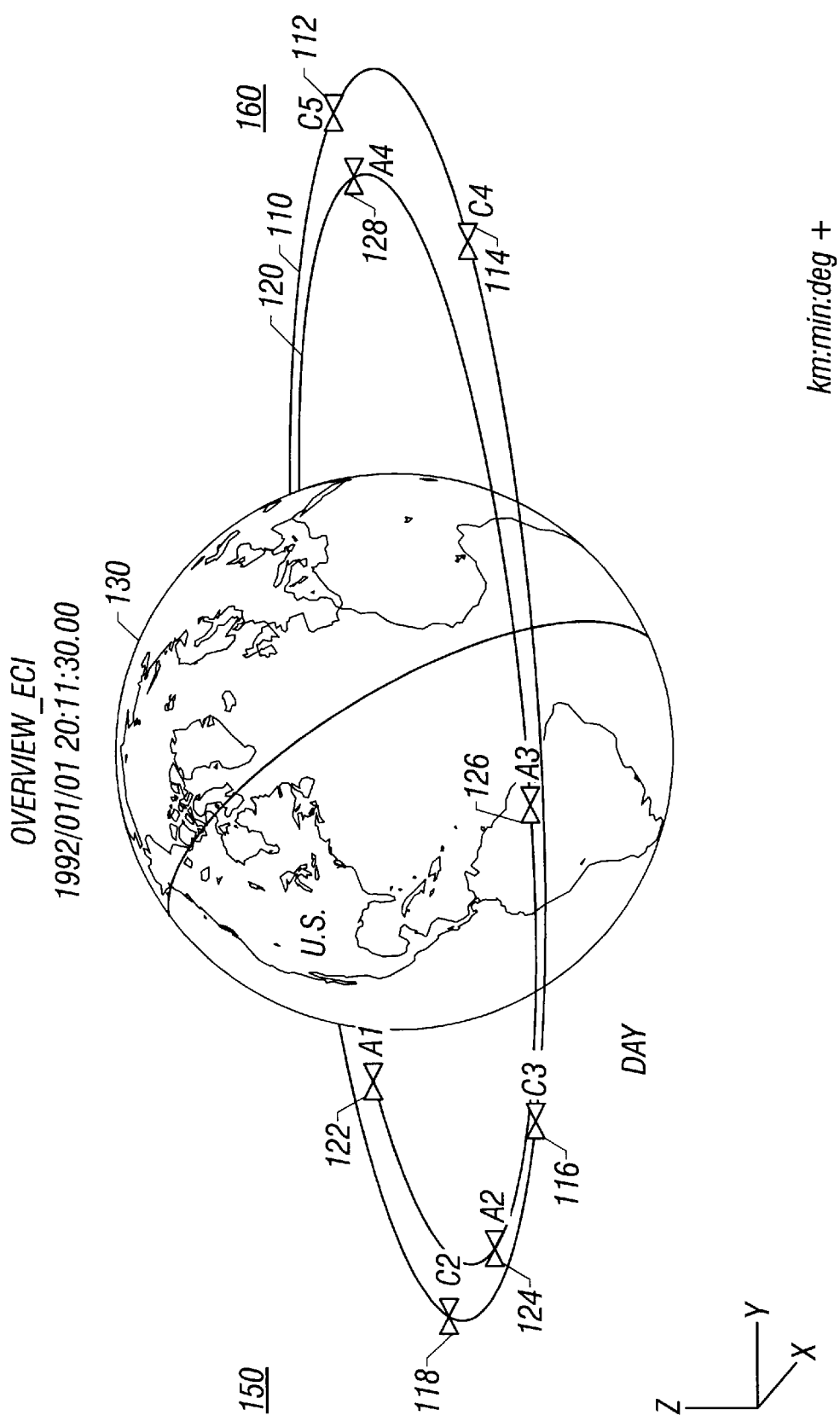
FIG. 1 shows a gear array type satellite system.

The gear array of the preferred embodiment is centered on the USA at noon time and is shown in FIG. 1.

Both rings of satellites 110 and 120 orbit the earth 130. The outer ring of satellites 110 is circular and is shown with five satellites. Satellites 112, 114, 116 and 118 can be seen in the drawing of FIG. 1. The fifth satellite is actually behind the earth in the drawing of FIG. 1 and cannot be seen in that drawing. Similarly, inner orbital array 120 includes satellites 122, 124 and 126 being shown with satellite 128 not being viewable in the view of FIG. 1.

The elliptical array 120 always has a smaller semi-major axis, and hence a smaller period, than the circular array 110. The elliptical array is hence within the circular array. Hence, the number of satellites in the elliptical array 120 must always be less than the number of satellites in the circular array 110. The periods of the satellites, however, are specially adjusted. These periods must exactly match the integral number ratio of the number of satellites in one ring with that in the other. In this embodiment, there are five satellites in the circular ring 110 with periods of 4.8 hours. Therefore, since there are four satellites in the elliptical ring, the elliptical periods must be 4 to 5 times 4.8 hours, or 3.84 hours. Mathematically the relationship between the ring is $N_e/N_c = T_e/T_c$, where $N_e$=the number of elliptical satellites and $N_c$ equals the number of circular satellites, and $T_e$ and $T_c$ are the periods of the elliptic and circular rings, respectively. In this embodiment, the period ratio of 4 to 5 yields a semi-major axis ratio of $(4/5)^{2/3} = (0.8)^{0.66667}$.

The satellites in the elliptical array lie in the equatorial planes and are apogee pointing toward the sun ("APTS") satellites, as described in more detail in U.S. Pat. No. 5,582,367, the disclosure of which is herewith incorporated by reference.

The satellites are also located such that satellites on the daytime side 150 are substantially evenly spaced between those in the circular ring. The apogees of those satellites is preferably equal to or close to (e.g., within 5%) the actual height of the circular ring. Therefore, for daytime coverage anywhere in the world (as shown in FIG. 1 for the U.S.), the satellites 116, 124 and 118 are evenly spaced. This provides augmented and even daytime coverage, since the elliptic satellites spend more time on the daytime side of the earth.

Also, the elliptical orbit is tangential to the diameter of the circular orbit. More preferably, the two orbits are in the same plane.

On the nighttime side of the earth 160, the integrity of the circular ring is maintained, so that the circular satellites provide some coverage of the earth. However, since less people are awake at night, nighttime coverage becomes less critical.

Advantages include the following. Overall coverage is effectively biased towards daytime hours when it is most needed. During nighttime hours less coverage is provided, but less usage is also expected. Moreover, since the time of maximum coverage occurs when the elliptical satellites are farthest from the earth, the latitude coverage on the daytime side may be extended to larger limits.

Second, each of the elliptical satellites requires less delta V than would be required for an equivalent circular satellite. Hence, this effectively shows that those satellites cost less to boost into orbit.

Figure 2:
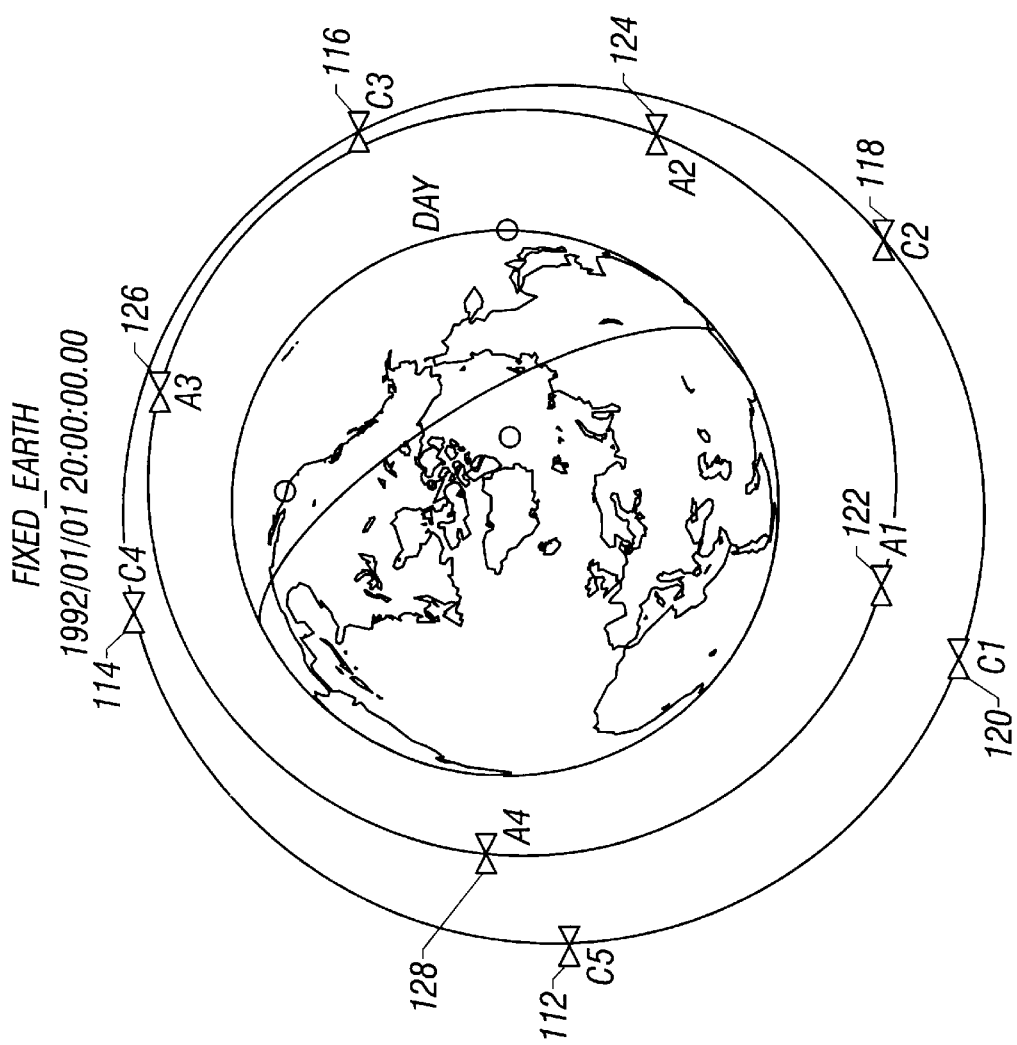
FIGS. 2–4 show views of the gear array system at different times.

Additional details of the gear array are shown in the other figures. FIG. 2 shows a top view of the entire satellite array showing all of the satellites but at a slightly different time from that shown in FIG. 1. FIG. 1 shows the hypothetical time of 11:30, while FIG. 2 shows the hypothetical time of 20:00. The system shows that the daytime side of the earth has satellites 126, 116 and 124 that are substantially evenly spaced. Coverage on the nighttime side of the earth is more sporadic, but there is still coverage from the circular satellites 112 and 119, and some supplemental coverage of other areas from the elliptical satellites.

Figure 3:
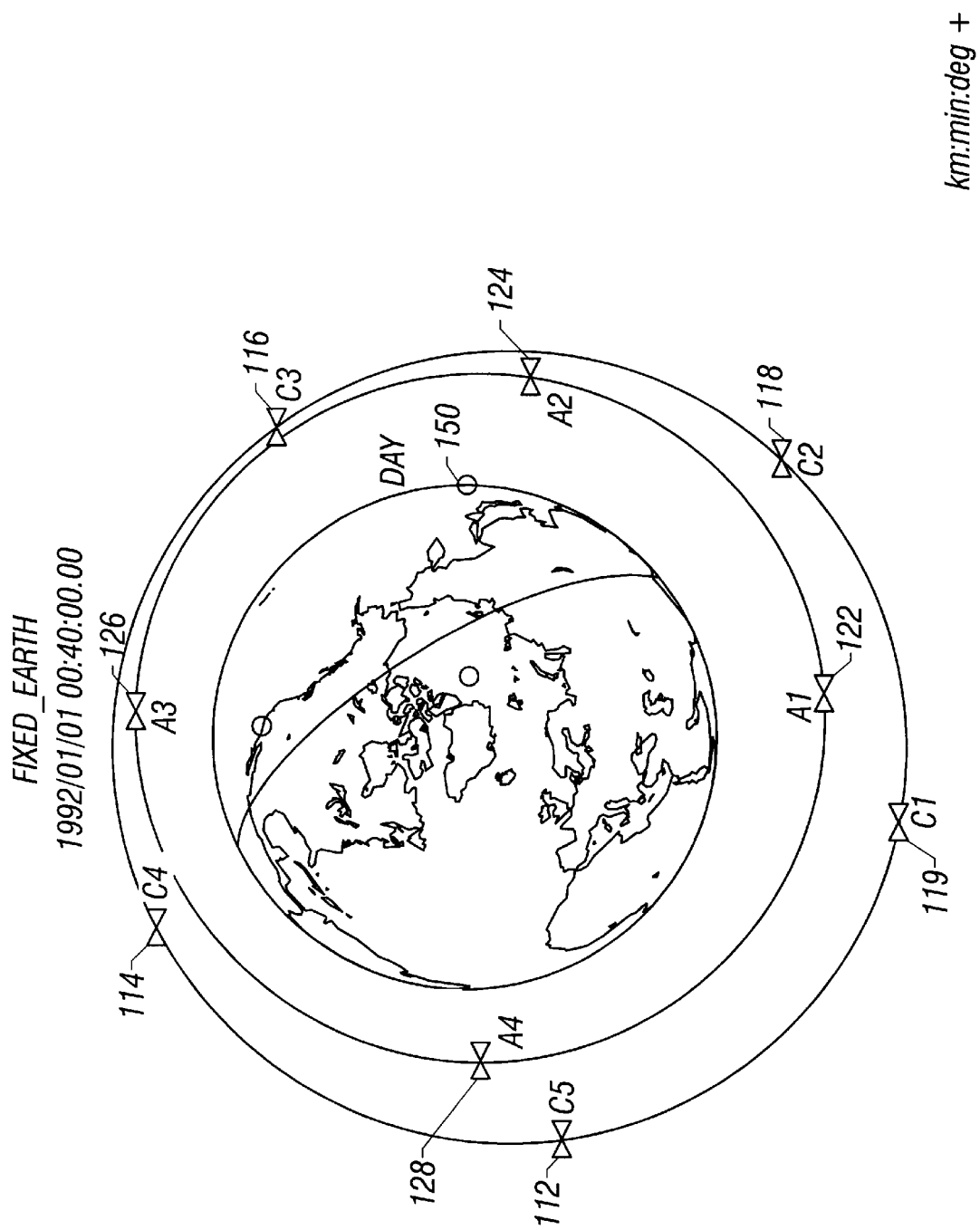

The coverage 20 minutes later, at 0400, is shown in FIG. 3. Satellite 126 has continued to rotate, and has progressed out of the view of the earth station 150. The daytime side is still covered by three equally spaced satellites, however, 116, 124, and 118. All of these are compensated for fixed earth. This shows how, however, the operation has changed.

Figure 4:
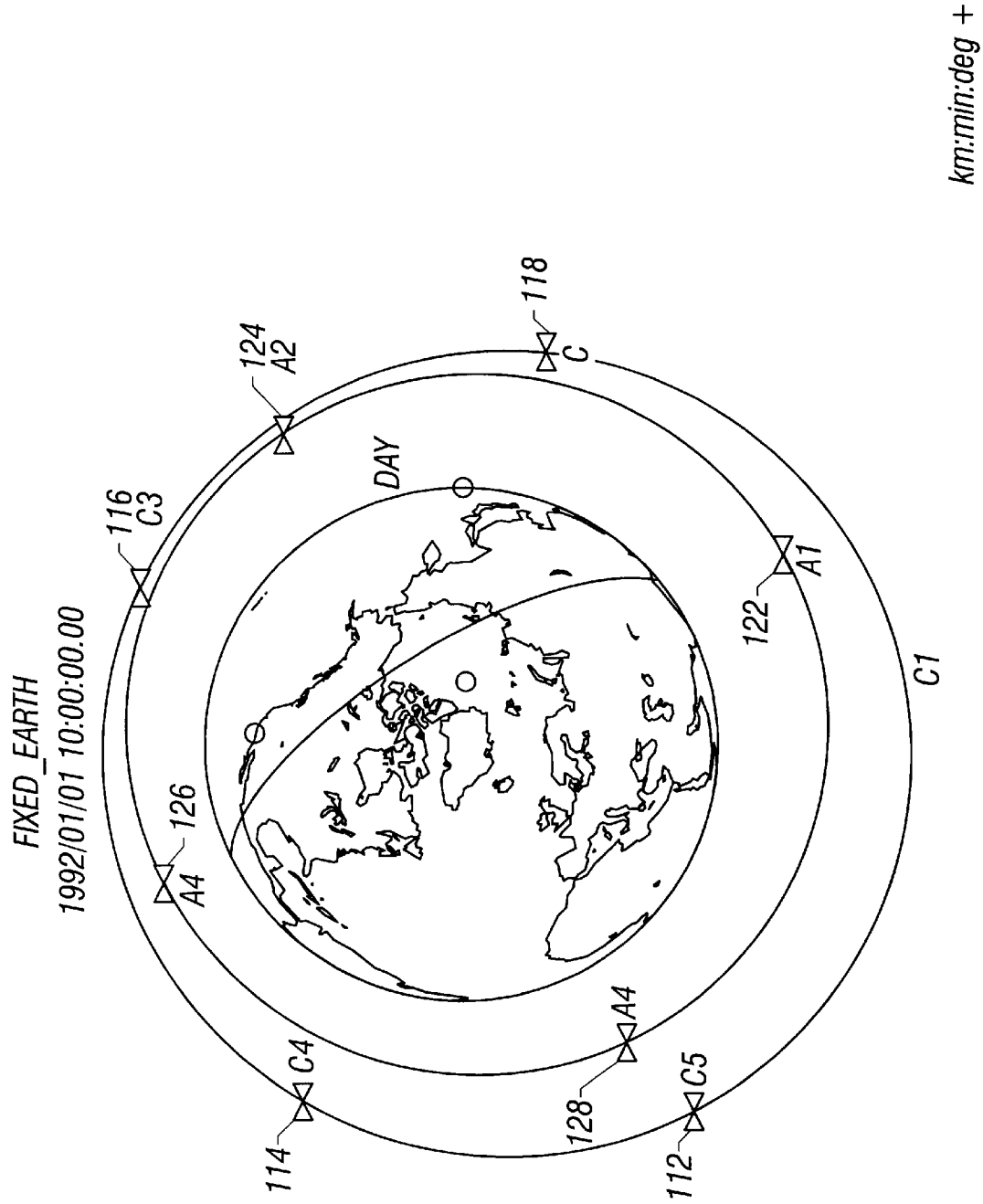

At a somewhat later time, at 0100, the earth station 150 again sees a different collection of satellites with equal spacing between satellites 122, 118, 124; and satellite 116 somewhat moving out of the range of the earth station. The positions of the other satellites are also shown in FIG. 4.

These few views illustrate how the satellite operates.

Other embodiments are also possible. For example, another preferred embodiment uses a ratio of 5 to 6 between the elliptical and circular arrays. We have calculated the orbital parameters for a 5 to 6 system in which the higher order earth gravitational constant have been included, and wherein the apogee trace of the elliptic ring is exactly tangential to the circular ring. This altitude (for elliptic apogee height as well as circular orbit height) is 7713.115 km.

Preferably, these arrays are all in the equatorial plane. However, similar operations could be carried out with inclined arrays of various types.

What is claimed is:

1. An array of communication satellites, each communicating with a point on the earth, said array of communication satellites comprising:

a first circular ring of satellites, and a second, elliptical ring of satellites, each of said first and second rings orbiting in or very near the same plane, and one of said rings having a smaller semi-major axis than the other of said rings;

a first ratio between a first number of satellites in said first ring and a second number of satellites in said second ring being the same as a second ratio between a first time required for each of said first satellites in said first ring to make an orbit and a second time required for each of said second satellites in said second ring to make an orbit, and an apogee position of one of said second satellites in orbit in said second ring being midway between two satellites in orbit in said first ring during at least a desired time of day.

2. An array of communication satellites having the characteristics of claim 1, in which the second elliptical ring is preferably composed of apogee pointing to the sun type satellites.

3. An array having the characteristics of claim 1, in which apogee altitudes of the second elliptical ring are the same as the orbital altitudes of the first circular ring satellites, (tangential case).

4. An array having the characteristics of claim 1, in which apogee altitudes of the elliptical ring satellites are either higher or lower than the circular ring satellites, in a way that maintains said apogee position between said satellites in said circular ring.

5. An array as in claim 1, in which the planes of both said first and second rings are equatorial and have an inclination= 0°.

6. An array as in claim 1, in which the planes of orbit of said satellites are sun-synchronous in inclined orbits, with (inclination relative to the equator being approximately 116.5°) with the elliptical ring apogees favoring a hemisphere of the earth which is lit by the sun.

7. An array as in claim 1, in which the planes are prograde inclined orbits, having inclinations relative to the equator of approximately≅63.4°, with apogees of said second, the elliptic ring favoring more heavily populated latitudes of the earth.

8. An array as in claim 6, in which a nodal regression rate of the circular ring satellites is made to match that of the elliptic ring satellites by means of an inclination angle offset slightly different (<5°) from the inclination of the elliptic ring (116.5°) while maintaining sun-synchronicity.

9. An array as in claim 7, in which the nodal regression rate of the circular ring satellites is made to match that of the elliptic ring satellites by means of an inclination angle offset slightly different (<5°) from the inclination of the elliptic ring (63.4°) while maintaining sun-synchronicity.

10. An array as in claim 8, in which the apogees of the elliptic ring can be adjusted to match both desired time-of-day coverage and latitudinal population density coverage.

11. An array as in claim 9, in which the apogees of the elliptic ring can be adjusted to match the desired latitudinal population density coverage.

12. An array of communication satellites, each communicating with a point on the earth, said array of communication satellites comprising:

a first circular ring of satellites, and a second, elliptical ring of satellites, each of said first and second rings orbiting the earth, and one of said rings being smaller in axial size than the other of said rings, during at least a time corresponding to a specified parameter, said first ring being tangential to said second ring at a specified tangent area, and satellites of said first ring and satellites of said second ring being spaced and between one another; a first ratio between a first number of satellites in said first ring and a second number of satellites in said second ring being the same as a second ratio between the time required for each of said first satellites in said first ring to make an orbit and a second time required for each of said second satellites in said second ring to make an orbit.

* * * * *